(No Model.)

D. S. SCHUREMAN & W. McCULLOCH.
NUT LOCK.

No. 282,572.        Patented Aug. 7, 1883.

Attest.

Jonathan Stevens.

Charles Tresenrider.

Inventors.

D. S. Schureman.

Wellington McCulloch

UNITED STATES PATENT OFFICE.

DAVID S. SCHUREMAN AND WELLINGTON McCULLOCH, OF CINCINNATI, OHIO.

NUT-LOCK.

SPECIFICATION forming part of Letters Patent No. 282,572, dated August 7, 1883.

Application filed February 10, 1883. (No model.)

*To all whom it may concern:*

Be it known that we, DAVID S. SCHUREMAN and WELLINGTON McCULLOCH, citizens of the United States, residing in the city of Cincinnati, Hamilton county, Ohio, have invented certain new and useful Improvements in Nut-Locks for Fish and other Joints, and other Purposes, of which the following is a specification.

The invention relates to the locking of nuts in the fish and other joints of railways; and the object of the invention is to prevent the nuts on the bolts of said joints from turning while in use and in place by the action of passing trains. The invention can also be applied to one or more gang-nuts used for other purposes, where the jar and strain of machinery in motion tend to loosen the nuts while in use. We attain this object by means of a simple mechanical device, illustrated in the accompanying drawings.

Figure 1:
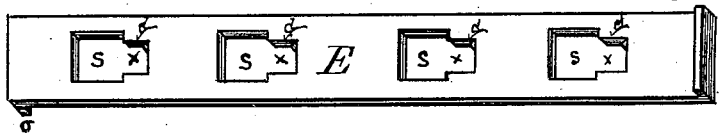
Figure 2:
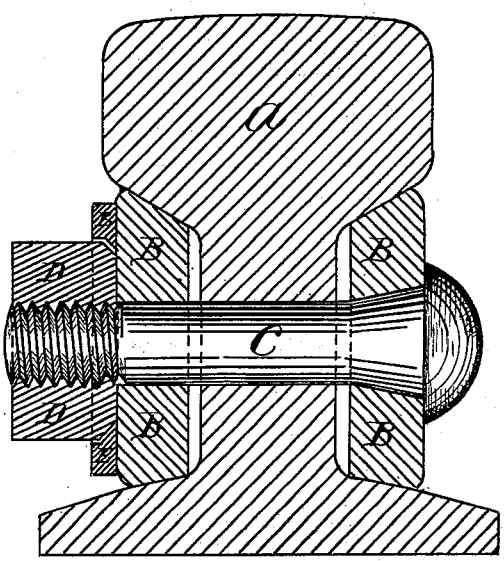
Figure 3:
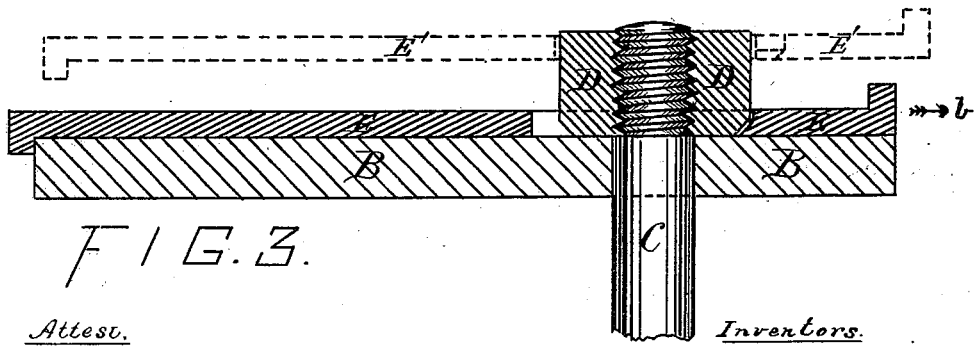

Figure 1 represents a side view of the device finished and ready to be applied to the nuts to be locked, and, for the purpose of illustrating the operation of our invention, we will describe its use as applied to a fish-joint, as in Fig. 2, which figure represents a vertical cross-section of a railway fish-joint with our device attached and in place, A A being the rail, B B B B the fish-bars, C the bolt, D the nut, and E E our lock or clamp in place. Fig. 3 is a horizontal section (parallel to the axis of the bolt-holes) of that fish plate or bar B B which is adjacent to the nut D D and of our clamp E E, showing, also, the adjacent portion of the bolt C on the plate, the bar, nut, bolt, and clamp forming one side of the joint shown in Fig. 2, parallel to the rail. The position of the lock and its relative parts when the nut is inserted therein and before it is driven into place is shown by E′ E′ in dotted lines.

The general shape of the lock or clamp is shown in Fig. 1 of the drawings. It is a bar of wrought or cast iron or other metal or material, having a lug or shoulder preferably located at or near one end to hold it in place on the joint-bar, and slots or apertures mortised through the bar in number, size, and relative position corresponding to the number, size, and relative position of the nuts to be embraced, as shown in the figure. The slots, apertures, or openings are of the shape in general shown in Fig. 1, one portion, S, being large enough to admit the nuts, and the other portion, X, being constricted enough to clamp the nut when the bar is moved, as hereinafter described, said constricted portion having edges in whole or in part beveled or grooved, being in the size and bevel or groove adjusted to the shape and counter-bevel or shoulder of the face and edges of the nut contiguous to the bar. The edges of the smaller or constricted portion, X, of the slots or apertures are so beveled or grooved as to leave the sharper edge against the fish-joint bar, and as to receive the corresponding edges or shoulders of the nuts when the clamp is driven into place, and thus clasp the nut about its edges in firm embrace. The lug or shoulder is so made on the side of the clamp applied to the joint-bar that when the clamp is driven into place the lug will catch over the end of the joint-bar and prevent the clamp from slipping back out of place when once driven into position. A shoulder may be forged or cast upon the other end of the clamp, as shown in Fig. 1, for convenience in placing the clamp or lock in and removing it from position. The nuts, or their equivalents, should be beveled or made with a shoulder on the edges facing the bar, as shown by D in Fig. 2. The square nuts in common use have beveled edges on the upper face, and when reversed will readily answer the purpose.

We think that in practice the clamp will be found of sufficient strength for railway service if made of bar or plate iron of from one-fourth to one-eighth of an inch in thickness.

To apply the lock or clamp it is but necessary to put the nuts on the bolts with the beveled corners facing the bar and screw them up firmly against the joint-bar, so that the nuts may have their edges parallel to each other and to the edges of the bar. Then put on the clamp or lock, as shown by E′ E′, Fig. 3, so that the nuts will protrude through the larger portion of the slots or apertures and press the clamp against the joint-bar. The lug intended to catch the end of the joint-bar will rest on the side of the joint-bar. Then, with a hammer, strike the opposite end of the clamp and drive it into the position shown by E E in Fig. 3. The lug will spring over the end of the joint-bar, and will hold the clamp or lock firmly in place, and the beveled edge or edges of the lesser portions of the apertures will be driven under and against the beveled corner or corners of each nut, and will hold the nuts in firm embrace. The edge or edges of the lesser portion, X, of the apertures impinging against the nuts will prevent the nuts from turning on the bolts, while the beveled edge or edges in the lesser portion, X, will impinge under the counter-bevel of the nut and prevent a movement of the clamp at right angles from the joint-bar or from buckling.

If preferred, a groove and corresponding shoulders may be employed, instead of the beveled edges and corners; but the latter are simpler in construction, and will answer every purpose.

The lock or clamp can readily be removed, when desired, by the use of a crow-bar to spring the lug from its place over the end of the joint-bar, and a hammer to drive the clamp back, so that the nuts come respectively into the larger portions, S, of the apertures, whereupon the clamp can easily be detached.

Fish-bars, bolts, and nuts may be, and now usually are, made of uniform size, shape, thread, and pattern; and our device may be readily manufactured and completed in the shop, so that it will fit snugly and firmly into place when applied to the joint without mechanical difficulty or labor. When desired, the lug to hold the clamp in position may be made to fit into a hole or slot in the body with which it is to engage. If preferred, the lug may be made on the bar or body to which the clamp is attached, and be received and held by a hole or slot in the clamp itself.

The advantage claimed for our device over other nut-locks is in simplicity, durability, and cheapness. One lock of our invention is sufficient to hold a number of gang-nuts firmly in position at a trifling cost and for a great length of time.

Our lock can readily be applied to railway-joints already in use by simply reversing the nuts. The nuts commonly used, having edges at right angles to each other and beveled on the face, are readily locked by our device when put on the bolt in a reversed position.

Our invention is also applicable to nuts of any pattern by making the lesser portion X, of the aperture to so conform to the shape of said nuts as to readily engage with them. Where a washer is employed between the nut and the bar B B the bevel upon the portion X of the aperture may engage a bevel on said washer, in which event the bevel on the nut may be dispensed with. For railway-joints the bar B B may be of various configurations—as, for example, what is known as the common "fish bar form;" or it may be of the form known as the "Fitz and Sayre form" or other form, and in such event the depth of the clamp will be modified to accommodate said bar.

That feature of our invention which relates to the combination of the large opening, S, communicating with the smaller opening, X, and that feature which relates to the application of bevels or grooves, &c., in connection therewith, may separately or together be employed in connection with any suitable device for holding the clamp, when locked upon the nuts, from slipping back, so as to release them until released by human agency; and while the lug O, Fig. 1, is the preferred form of device for so holding the clamp, other devices may be employed for such purpose.

While the various features of our invention are preferably used together, one or more of them may be employed apart from the remainder, and one or more of them may be employed, so far as applicable, in connection with joints and nut-locks of descriptions other than that particularly herein specified.

What we claim as our invention, and desire to secure by Letters Patent, is—

1. An elastic nut-lock clamp composed of a slotted bar provided with a locking-lug, one or more sides of at least one of the slots being rabbeted or beveled to pass under the edge of the nut, substantially as and for the purposes set forth.

2. The elastic clamp E, having an aperture or apertures provided with enlarged portion S and constricted portion X, said constricted portion having a beveled edge or edges to slip under the nut, the clamp being provided with a lug, O, at that end of the bar toward which the mouth of the constricted portion X points, for preventing any movement of the clamp as would release the nut from the engagement with the edge of the aperture X, substantially as and for the purposes set forth.

3. An elastic bar, of iron or other suitable metal, with apertures or slots corresponding in number with the nuts to be locked, two or more edges of the aperture or slots impinging on the edges of the nuts, the edges of said apertures or slots being adapted to conform to and grasp the rounded edges of the nuts, and the sides of the nuts, as distinguished from the faces of the nuts, being at right angles with the said faces, a lug on the end of the bar being provided to spring over the edge of metal and to prevent the bar slipping endwise from the nut, substantially as and for the purposes set forth.

DAVID S. SCHUREMAN.
WELLINGTON McCULLOCH.

Witnesses:
R. S. FULTON,
PETER RUFFIN.